United States Patent [19]
Baer

[11] Patent Number: 5,285,691
[45] Date of Patent: Feb. 15, 1994

[54] APPARATUS FOR MONITORING OPERATION OF A DRIVE SHAFT

[75] Inventor: John S. Baer, Bar Harbor, Me.

[73] Assignee: Dana Corporation, Toledo, Ohio

[21] Appl. No.: 992,506

[22] Filed: Dec. 17, 1992

Related U.S. Application Data

[62] Division of Ser. No. 758,999, Sep. 6, 1991.

[51] Int. Cl.$^5$ .................................................. G01L 3/02
[52] U.S. Cl. .............................. 73/862.325; 73/118.1
[58] Field of Search ............ 73/862.328, DIG. 3, 73/118.1, 862.321, 862.324, 862.325, 862.326, 862.327, 862.328, 862.329, 862.328; 324/167, 168, 173, 174, 178, 179

[56] References Cited

U.S. PATENT DOCUMENTS

| | | | |
|---|---|---|---|
| 2,518,149 | 8/1950 | Kearsley . | |
| 3,170,323 | 2/1965 | Kuhrt et al. | 73/DIG. 3 X |
| 3,194,065 | 7/1965 | Wilson | 73/862.328 X |
| 3,545,265 | 12/1970 | McIlraith et al. | 73/862.328 X |
| 3,625,055 | 12/1971 | Lafourcade | 73/862.33 |
| 4,027,182 | 5/1977 | Sprinkle | 310/111 |
| 4,100,794 | 7/1978 | Meixner . | |
| 4,704,523 | 11/1987 | Uchida | 250/231 SE |
| 4,724,710 | 2/1988 | Murty | 73/862.33 |
| 4,765,434 | 8/1988 | Kawamoto et al. | 180/249 |
| 4,782,431 | 11/1988 | Park | 362/61 |
| 4,805,465 | 2/1989 | Gerrath et al. | 73/862.328 |
| 4,838,077 | 6/1989 | Shifflet et al. | 73/118.1 |
| 4,874,053 | 10/1989 | Kimura et al. | 180/79.1 |
| 4,881,414 | 11/1989 | Setaka et al. | 73/862.33 |
| 4,924,169 | 5/1990 | Shifflet et al. | 320/21 |
| 4,940,936 | 7/1990 | Grillo et al. | 324/174 |

FOREIGN PATENT DOCUMENTS 285118 12/1913 Fed. Rep. of Germany .
3213589 4/1981 Fed. Rep. of Germany ... 73/862.34

*Primary Examiner*—Jerry W. Myracle
*Attorney, Agent, or Firm*—John H. Crozier; Robert M. Leonardi

[57] ABSTRACT

There is provided an apparatus for measuring operating parameters of a rotating shaft, which apparatus includes an encoder module attached to a first end of the shaft, an elongate member having a first end attached to a second end of the shaft and extending along the shaft, and an encoder disk attached to a second end of the elongate member and operatively disposed in proximity to the encoder module, such that twisting of the shaft caused by torque applied thereto will cause relative angular displacement between the encoder module and the encoder disk. In a further aspect of the invention, there is provided an apparatus for measuring the rate of revolution of a shaft, which apparatus includes a hollow, cylindrical, inwardly facing race defined within the shaft, a freely rolling ferromagnetic ball disposed in the race, and a permanent magnet with a coil therearound fixedly disposed with respect to the shaft and disposed near the race such that proximity of the ball to the magnet and coil will change the amount of magnetic flux to which the coil is otherwise subjected, so that the coil will output a pulse of current each time the magnet passes the ball as the shaft rotates.

5 Claims, 3 Drawing Sheets

APPARATUS FOR MONITORING OPERATION OF A DRIVE SHAFT

This is a division of application Ser. No. 758,999, filed Sep. 6, 1991.

BACKGROUND OF THE INVENTION

1. Field of the Invention

The present invention relates to the sensing of the rate of rotation of driveshafts and the torque applied thereto.

2. Background Art

For many years, hollow cylindrical drive shafts have been utilized to transmit rotational power between driving and driven components in many different types of vehicles. Drive shafts of this type are typically disposed beneath the bottom of a chassis or frame of the vehicle and, therefore, are exposed to a harsh environment. Frequently, such drive shafts are subjected to relatively large torsional and other stresses of varying magnitudes during normal use. Also, they may be driven at rotational speeds of up to 4000 revolutions per minute during normal use. All of these factors (as well as others) must be accounted for when designing the structure of such a drive shaft, so as to insure that the resulting component will not prematurely fatigue and fail during use. At the same time, it is important not to over-design the drive shaft to have an expected service life which extends long beyond the expected service life of the vehicle itself. Such an over-designed drive shaft would be wasteful in materials and would add undesirable cost and weight to the vehicle.

When designing vehicle drive shafts, reference can be made to techniques which have proven to be effective in evaluating and improving the design of movable mechanical members in general. One of such techniques involves the collection of data related to some of the performance characteristics of the movable member while it is actually in use. Such data acquisition typically entails the sensing of one or more predetermined parameters related to the structure and operation of the movable member. The sensed data is typically collected over a periods of time and stored. When a sufficient amount of data has been sensed and stored, it may be evaluated to generate information related to the sufficiency of the design of the movable member. For example, data acquired in this manner can be useful in determining the life span of the movable member, points of anticipated fatigue or failure on the movable member, the amount of usage of the movable member, and other performance information. Unfortunately, because of the location and nature of use of drive shafts within vehicles, it has not been readily possible to collect real time data related to the operation thereof while the drive shaft is in use on the vehicle. Accordingly, it would be desirable to provide an apparatus and method for gathering such data in this manner.

One such apparatus and method is described in U.S. Pat. No. 4,838,077, issued Jun. 13, 1989, to Shifflet et al, and titled APPARATUS AND METHOD FOR MONITORING THE OPERATION OF A VEHICLE DRIVE SHAFT, assigned to the assignee of the present invention, the disclosure of which patent is incorporated by reference hereinto. Therein, real time data related to certain performance characteristics over a period of time is collected and stored. The data may be subsequently evaluated to generate information regarding such performance characteristics or the sufficiency of the design of the drive shaft. The apparatus comprises an instrument mounted within the hollow shaft and includes a generator having a shaft with a pendulum attached thereto. As the shaft rotates, the pendulum and shaft remain motionless with respect to the rotation of the shaft and the generator provides an analog output proportional to the rate of rotation. The instrument also includes a strain gauge attached to the surface of the shaft which generates an analog output proportional to the torsional stress of the drive shaft. The instrument further includes a temperature sensor which generates an analog output proportional to the ambient temperature therein. The output signals are fed to a a control circuit which provides power to the instrument from batteries disposed within the shaft and which includes a microprocessor and a memory for processing and storing the acquired data. The control circuit also includes a wake-up circuit which generates an electrical output signal to the microprocessor when the drive shaft is rotated. So long as the drive shaft is rotated, the microprocessor maintains the control circuit in an active operating condition, whereby the data is sensed and stored as described above. However, when the drive shaft is not rotated for longer than a predetermined period of time, the microprocessor places the control circuit in a stand-by operating condition, in order to conserve energy consumption.

SUMMARY OF THE INVENTION

There is provided an apparatus for measuring operating parameters of a rotating shaft, which apparatus includes an encoder module attached to a first end of the shaft, an elongate member having a first end attached to a second end of the shaft and extending along the shaft, and an encoder disk attached to a second end of the elongate member and operatively disposed in proximity to the encoder module, such that twisting of the shaft caused by torque applied thereto will cause relative angular displacement between the encoder module and the encoder disk. In a further aspect of the invention, there is provided an apparatus for measuring the rate of revolution of a shaft, which apparatus includes a hollow, cylindrical, inwardly facing race defined within the shaft, a freely rolling ferromagnetic ball disposed in the race, and a permanent magnet with a coil therearound fixedly disposed with respect to the shaft and disposed near the race such that proximity of the ball to the magnet and coil will change the amount of magnetic flux to which the coil is otherwise subjected, so that the coil will output a pulse of current each time the magnet passes the ball as the shaft rotates.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which.

DETAILED DESCRIPTION OF THE PREFERRED EMBODIMENTS

Figure 1:
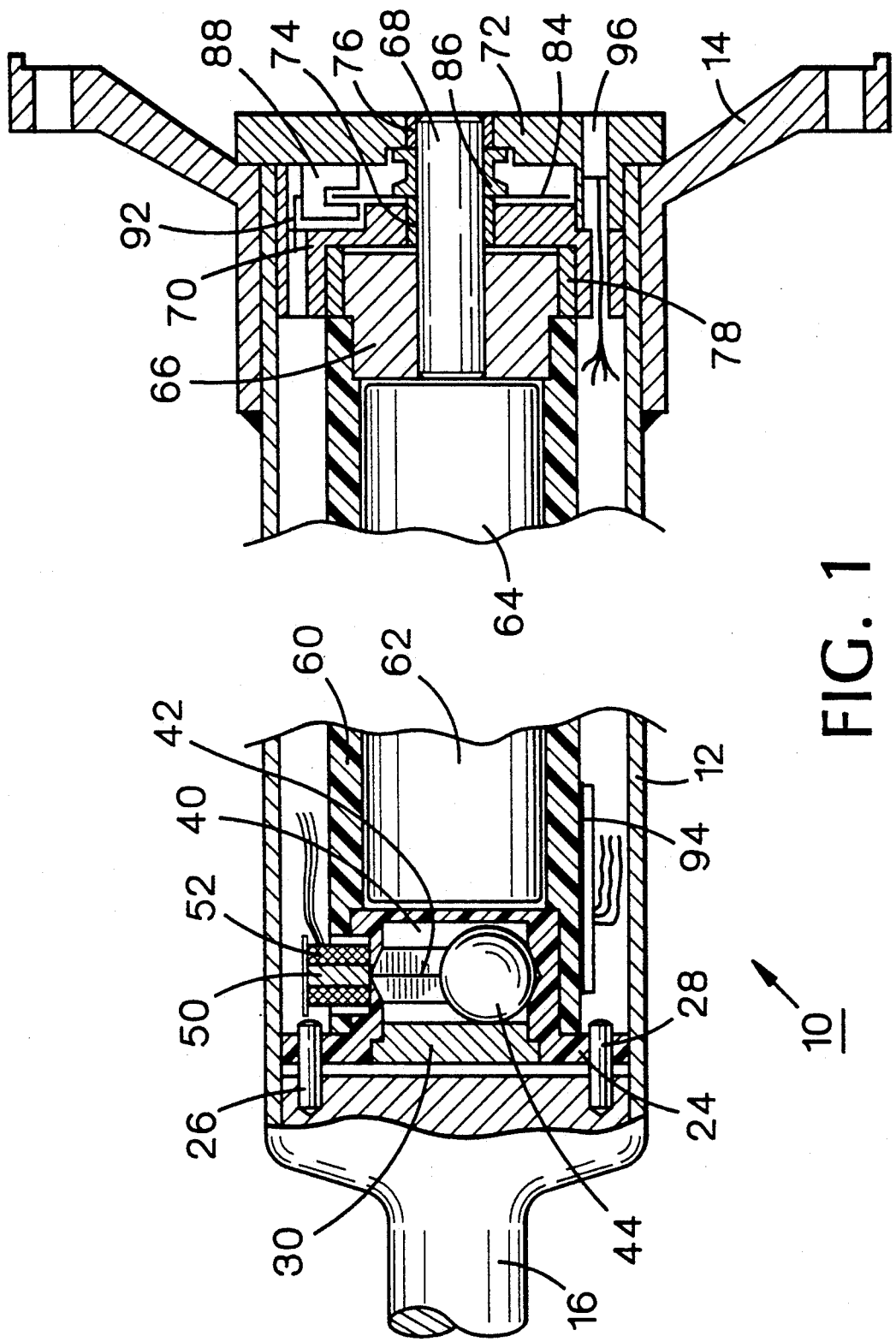
FIG. 1 is a side elevational view, partially in cross-section, of a drive shaft with the elements of one embodiment of the present invention disposed therein.

Referring now to the drawings, FIG. 1 depicts a drive shaft, generally indicated by the reference numeral 10, with elements of one embodiment of the present invention disposed therein.

Drive shaft 10 includes a hollow, cylindrical tube portion 12 having attached to a first end thereof an input flange 14 and attached to a second end thereof an output shaft 16. It will be understood that input flange 14 will be operatively attached to a rotating engine or other driving means (not shown) and that output shaft 16 will be operatively attached to a driven member (not shown) and that the input flange 14, the output shaft 16, and the tube portion 12 rotate as a unit.

A first end fitting 24, of PVC or aluminum, is attached to output shaft 16 by means of drive pins, such as drive pins 26 and 28, the pins being slip fitted to accommodate expansion. First end fitting 24 is closed by means of a first end plate 30, of PVC or aluminum, attached thereto. The interior of first end fitting 24 defines a hollow cylindrical race 40 having a concave V-shaped trough 42 defined in the inner periphery thereof. A freely rolling steel ball 44 is disposed in race 40 in contact with the edges of trough 42, which contact resists axial movement of the ball with respect to the race. Closely disposed near the root of trough 42 is a permanent magnet 50 surrounded by a coil 52, the magnet and coil being fixedly disposed with respect to race 40.

When drive shaft 10 rotates, ball 44 will remain in position at the bottom of race 40 by virtue of gravitational force. Since magnet 50 and coil 52 rotate with drive shaft 10, they will pass ball 44 once each revolution of the drive shaft. As magnet 50 and coil 52 pass ball 44, the ball causes a change in the magnetic flux in the coil, thus producing an output pulse of current.

Attached to first end fitting 24 is a hollow, cylindrical battery tube 60, of PVC, having fitted therein batteries, such as batteries 62 and 64. The end of battery tube 60 opposite first end fitting 24 is closed by means of a second end fitting 66 attached to the battery tube. A support shaft 68 is attached to the center of second end fitting 66 and extends axially therefrom. Support shaft 68 passes through and is journaled in a support member 70 and a second end plate 72, of PVC or aluminum, by means of sleeve bearings 74 and 76, respectively. Second end fitting 66 is also journaled in support member 70 by means of a sleeve bearing 78.

A conventional multisegment encoder disk 84 is attached to an encoder mount 86 which is attached to support shaft 68. A conventional encoder module 88 is attached to end plate 72 in operative relationship to encoder disk 84 to determine the angular position thereof.

Encoder disk 84 is, effectively, attached to the first end of tube portion 12. Since encoder module 88 is attached to second end plate 72, any twisting of tube portion 12, due to the torque applied by input flange 14, will result in relative angular displacement of the encoder module and encoder disk 84. Such displacement is detected by encoder module 88 and position information is transmitted to electronic control circuitry on printed circuit board 94 attached to the outer surface of tube portion 12. Preferably, encoder module 88 provides a quadrature output so that the direction of twist can be determined. The control circuitry of printed circuit board 94 may be substantially similar to that described in the above-referenced U.S. Pat. No. 4,838,077, suitably modified by conventional means to directly accept digital rather than In use, when drive shaft 10 is not rotating, the control circuitry on printed circuit board 94 is in a stand-by state. When drive shaft 10 begins rotating, the first output from coil 52 is a wake-up pulse which causes full activation of the system. The rate of subsequent pulses from coil 52 is a direct indication of the rate of rotation of drive shaft 10. That information, together with torque information derived from encoder module 88, can be used to develop a history of use of the vehicle or machinery of which drive shaft 10 is a part, as is described in detail in the above-referenced patent.

As can be seen, the above-described embodiment of the present invention is totally contained within drive shaft 10 and, depending on battery life, may run for a considerable length of time. Whenever it is desired to access the history-of-use information stored in the control circuitry of printed circuit board 94, the memory therein can be connector 96 disposed in second end plate 72.

Except for the preferred materials of construction noted above for certain elements, the elements described can be formed of any suitable materials.

The embodiment of the present invention described above with reference to FIG. 1 is quite satisfactory when drive shaft 10 is relatively short, say, up to about two feet in length. For longer shafts, perhaps six to eight feet in length, that embodiment becomes less satisfactory, since intermediate bearing structures are required to support battery tube 60.

Figure 2:
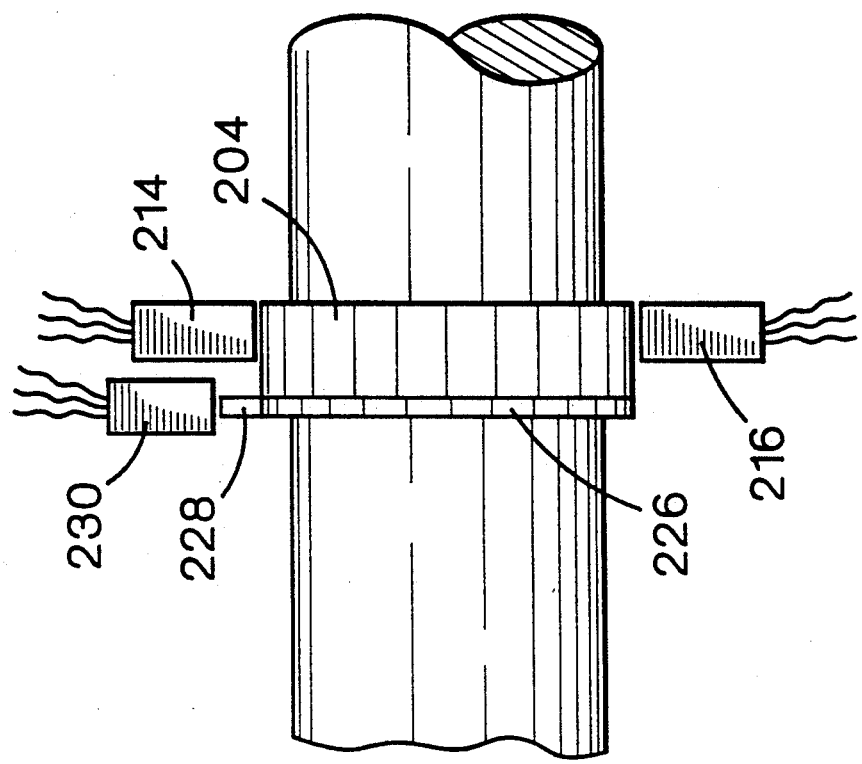
FIG. 2 is a side elevational view of a drive shaft including elements of another embodiment of the present invention.
Figure 2:
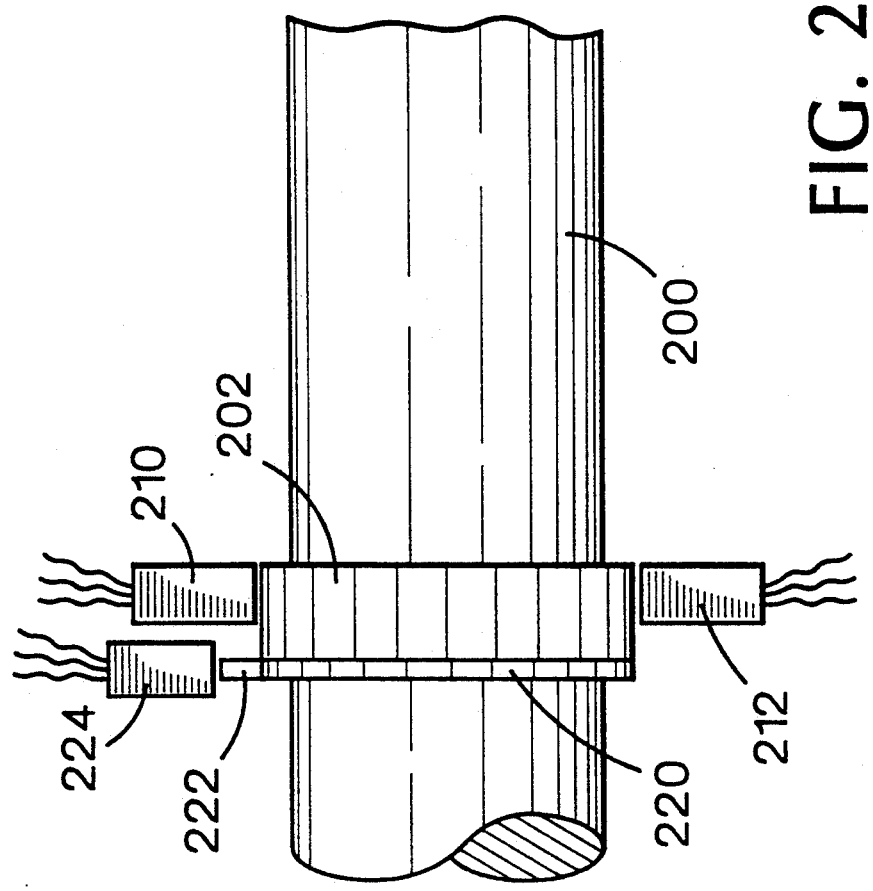

FIG. 2 illustrates an embodiment of the present invention which may be employed for longer shafts. Here, there is shown a drive shaft, or other compliance member, 200. Mounted on a first end of shaft 200 is a first toothed ferromagnetic wheel, or tone wheel, 202 and mounted on a second end of shaft 200 is a second tone wheel 204. Disposed in quadrature around first tone wheel 202 are Hall effect sensors 210 and 212 and disposed in quadrature around second tone wheel 204 are Hall effect sensors 214 and 216. As is well known, a Hall effect sensor will output a pulse when a ferromagnetic tooth passes underneath it.

Hall sensor pairs 210//212 and 214/216 will each output an up or down count of pulses depending upon the direction of rotation of shaft 200; however, one output will lag the other by the angle of wrap caused by torque applied to shaft 200. Alternatively, a pair of optical or magneto resistive sensors may be employed in the same manner.

An auxiliary wheel 220 with a single tooth 222 thereon is disposed adjacent tone wheel 202 so that the tooth will pass under a Hall sensor 224. Likewise, an auxiliary wheel 226 with a single tooth 228 thereon is disposed adjacent tone wheel 204 so that the tooth will pass under Hall sensor 230. Auxiliary wheels 220 and 226 with Hall sensors 224 and 230 may be provided to furnish output signals for reset purposes if desired.

Figure 3:
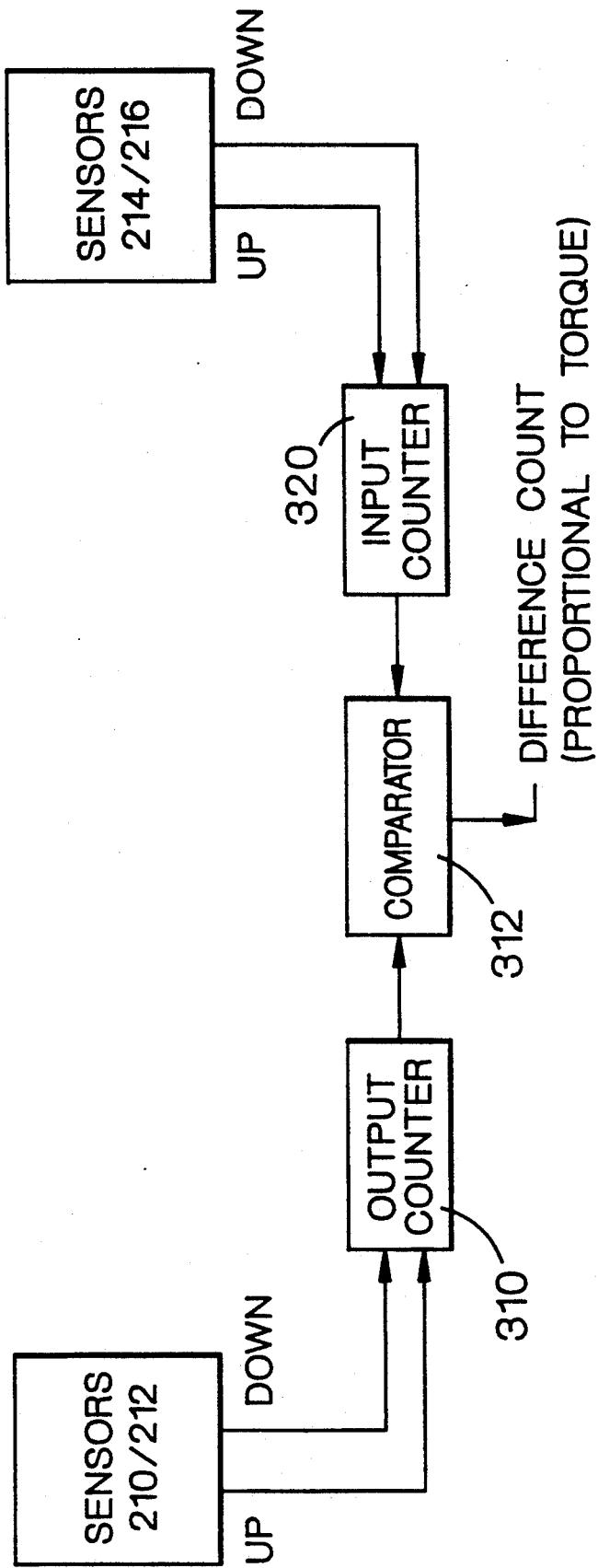
FIG. 3 is a block diagram illustrating circuitry to process output data from the instruments of FIG. 2.

FIG. 3 illustrates circuitry which may be employed to process the signals from Hall sensor pairs 210/212 and 214/216 of FIG. 2, generally indicated by the reference numeral 300. Hall sensor pair 210/212 provides up and down counts, depending on the direction of rotation, to a counter 310 which, in turn, provides a first input to a comparator 312. Likewise, Hall sensor pair 214/216 provides up and down counts to a counter 320 which, in turn, provides a second input to comparator 312. The output of comparator 312 is a difference count proportional to the torque applied to shaft 200 (FIG. 2). The latter output, suitably converted to an analog signal can be an input to control circuitry such as is described in the above-referenced patent.

While the embodiment shown on FIG. 2 employs elements external to shaft 200, it will be understood that, by suitable modification within the knowledge of those skilled in the art, the external elements could be disposed within a hollow shaft so as to have a completely enclosed system similar to that shown on FIG. 1.

It will understood that certain changes may be made in the above construction without departing from the scope of the invention, and it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An apparatus for measuring torque applied to a shaft, comprising:
    (a) a first tone wheel attached to said shaft, the plane of said tone wheel being orthogonal to the major axis of said shaft;
    (b) a first pair of sensors disposed in quadrature in magnetically coupled relationship with said first tone wheel to output a first train of pulses as said first tone wheel rotates past said first pair of sensors;
    (c) a second tone wheel attached to said shaft and spaced apart from said first tone wheel, the plane of said tone wheel being orthogonal to the major axis of said shaft;
    (d) a second pair of sensors disposed in quadrature in magnetically coupled relationship with said second tone wheel to output a second train of pulses as said second tone wheel rotates past said second pair of sensors; and
    (e) means to output a difference count between said first and second train of pulses, the difference count being proportional to said torque applied to said shaft.

2. An apparatus for measuring torque, as defined in claim 1, wherein said first and second pairs of sensors comprise pairs of Hall effect sensors.

3. An apparatus for measuring torque, as defined in claim 1, further comprising means to reset said means to output.

4. An apparatus for measuring torque, as defined in claim 3, wherein said means to reset comprises:
    (a) a third tone wheel attached to said shaft in proximity to said first tone wheel and parallel thereto, said third tone wheel having thereon a number of teeth less than the number of teeth on said first tone wheel;
    (b) a fifth sensor disposed in magnetically coupled relationship with said third tone wheel to output a resetting pulse as each tooth of said third tone wheel passes said fifth sensor;
    (c) a fourth tone wheel attached to said shaft in proximity to said second tone wheel and parallel thereto, said fourth tone wheel having thereon a number of teeth less than the number of teeth on said second tone wheel; and
    (d) a sixth sensor disposed in magnetically coupled relationship with said fourth tone wheel to output a resetting pulse at each tooth of said fourth tone wheel passes said sixth sensor.

5. An apparatus for measuring torque, as defined in claim 4, wherein said sensors comprise Hall effect sensors.

* * * * *